UNITED STATES PATENT OFFICE.

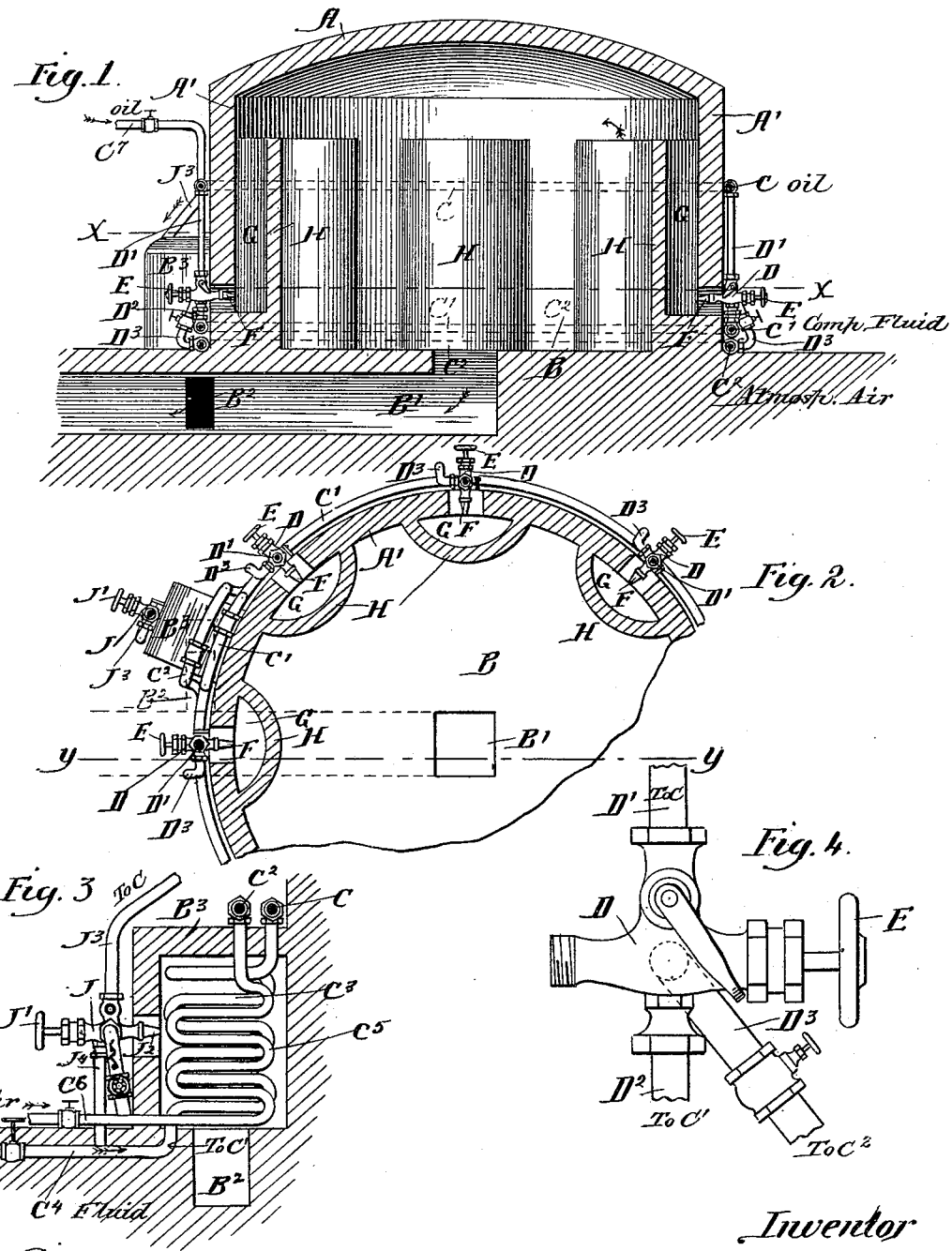

WALTER B. WRIGHT, OF CHICAGO, ILLINOIS, ASSIGNOR TO THE INTERNATIONAL GAS AND FUEL COMPANY, OF SAME PLACE.

BRICK-KILN.

SPECIFICATION forming part of Letters Patent No. 405,935, dated June 25, 1889.

Application filed February 6, 1889. Serial No. 298,813. (No model.)

*To all whom it may concern:*

Be it known that I, WALTER B. WRIGHT, a citizen of the United States, and a resident of Chicago, in the county of Cook and State of Illinois, have invented a certain new and useful Improvement in Brick-Kilns, of which the following is a specification.

My invention relates to brick-kilns, and especially such as are operated by fluid fuel, and has for its object to provide convenient means for drying and burning brick and the like in kilns. This object I accomplish in the accompanying drawings, wherein—

Figure 1 is a vertical section taken, for example, on line Y Y of Fig. 2. Fig. 2 is a horizontal section taken on line X X of Fig. 1. Fig. 3 is a vertical section through the auxiliary heating-furnace. Fig. 4 is a detail of the compound valve.

Like parts are indicated by the same letter in all the figures.

A is the top of the kiln, A' the upper exterior wall, and B the base on which it rests.

B' is the channel passing downwardly, for example, through the middle of the kiln and out to the smoke-stack.

$B^2$ is a branch in such channel leading from the auxiliary furnace $B^3$. Three pipes pass entirely around the kiln. The upper pipe is marked C, the next C', and the lower $C^2$. The pipe C' connects with a coil $C^3$, and this with a pipe $C^4$, which leads from the compression-chamber and supplies fluid under compression to the pipe C', the same being introduced as indicated by the arrow. The pipe $C^2$ passes entirely around the kiln, and in like manner connects with the coil $C^5$, which is supplied with air, as indicated by the arrow, through the exterior pipe $C^6$.

C is an oil-pipe passing around the kiln, and it is supplied from the distant oil-tank by means of the pipe $C^7$, through which the oil passes in the direction indicated by the arrow.

D D D are fluid-feeding compound valves connected each with the three pipes C, C', and $C^2$. Each of these valves is connected from above with the pipe C by the short pipe D', each is connected with the pipe C' by the short pipe $D^2$, and each is connected with the pipe $C^2$ by the short curved pipe $D^3$. Each of these pipes may be controlled by a valve, if desired.

E E are the hand-pieces of such valves, and F are the nozzles through which they discharge into the chambers G, formed by the curved walls H H.

J is a similar valve, having the handle J' and the nozzle $J^2$, and this valve is connected by the pipe $J^3$ with the oil-pipe C, by the pipe $J^4$ with the compressed-air pipe $C^4$, and by the pipe $J^5$ with the atmospheric-air pipe $C^6$.

The pipe C is used to introduce oil into the various discharge-valves, the pipe C' to introduce fluid under pressure, and the pipe $C^2$ to introduce the atmospheric air when desired.

By the various arrangements of the valves and the structure of the discharge compound valves D and J any number of the three fluids may be commingled and discharged at any desired point upon the kiln and in such relative quantities as may be desired by the operator.

It will be clear that considerable alteration as to the form, number, and operation of the parts might be made without departing from the spirit of my invention.

The use and operation of my invention are as follows: It is desirable in drying and burning brick and the like that they should first be dried and then burned, and that the drying should take place with no great heat being used, and also without the products of combustion being spread over the bricks. After having been dried, it is then desirable that great heat should be applied. If the brick in the first instance are subjected to the actions of the products of combustion, they are likely to be coated, so as to interfere with the process of drying. If they are subjected to great heat, they are likely to crumble and be otherwise injured. By my kiln it will be seen that it will be possible in the first place to introduce atmospheric air alone through the various discharge-nozzles, if that be desired, the same passing up into the kiln about the brick, down through the channel B', and into the stack or flue. It will also be possible to supply this atmospheric air under greater or less heat, the same being generated in the chamber $B^3$, through which such atmospheric air passes, by means of the coil. It will also be possible by opening the valves in the pipe $C^4$ to supply either alone or along with atmospheric air any quantity of compressed air or fluid, in like manner this also being heated in the auxiliary furnace B³. After this hot air, either atmospheric or under pressure, or both combined, has been passed through the brick or kiln for a sufficient length of time to thoroughly dry the brick or contents of the kiln, the brick may be burned as follows: A current of oil or fluid fuel is introduced by operating the valve of pipe C⁷ and the suitable valves in pipes D' D', or in the compound valve, into each of the discharge-nozzles, where it is caused to burn together with suitable quantities of atmospheric air or air under pressure, or both. The compound valve or burner J is supplied with oil by the pipe J³ from the pipe C, the fluid under pressure by the pipe J⁴ from the pipe C⁴, and with atmospheric air, if desired, by the pipe J⁵ from the pipe C⁶. The valve proper of the compound valve, as operated by the handle E, controls the pipes D² D² and J⁴, respectively.

I claim as new and desire to secure by Letters Patent—

1. The combination of a kiln with an auxiliary furnace, pipes for supplying a drying-fluid, which said pipes pass through such furnace and open into the kiln, and pipes for supplying fluid fuel, which open directly into the kiln, and which also open into such auxiliary furnace and thus heat the fluid passing therethrough.

2. The combination of a kiln with fluid-fuel pipes leading thereto, an auxiliary furnace, drying-fluid pipes which pass through such furnace, a burner-nozzle which opens from such fluid-fuel pipe into the furnace, and a series of compound valves with discharge-nozzles about such kiln and connected both with the fluid-fuel pipes and the drying-fluid pipes, so as to serve either as discharge-nozzles for the drying-fluid or burner-nozzles for the fluid fuel.

Dated this 2d day of February, 1889.

WALTER B. WRIGHT.

Witnesses:
FRANCIS W. PARKER,
CELESTE P. CHAPMAN.